Feb. 16, 1965 J. G. DRESSER 3,169,896

TAPE SPLICER

Filed Aug. 17, 1962 2 Sheets-Sheet 1

INVENTOR.
JASPER GILBERT DRESSER
BY
Barlow & Barlow
ATTORNEYS

TAPE SPLICER

Filed Aug. 17, 1962 2 Sheets-Sheet 2

INVENTOR.
JASPER GILBERT DRESSER
BY
Barlow + Barlow
ATTORNEYS

United States Patent Office 3,169,896

Patented Feb. 16, 1965

3,169,896

TAPE SPLICER

Jasper Gilbert Dresser, Boynton Beach, Fla., assignor to Dresser Products Incorporated, a corporation of Rhode Island Filed Aug. 17, 1962, Ser. No. 217,757

3 Claims. (Cl. 156—507)

The present invention relates to tape splicers and, more particularly, to apparatus for splicing punched data tape that is used in the data processing industry.

A data tape is punched with hole patterns according to messages. To advance the tape while it is being punched or while messages are being read out from the tape, the tape contains a series of regularly spaced feeder holes. Sometimes it is necessary to splice tapes at the end of a message or to splice a tape that is torn within a message. In either case, the regular spacing between the tape feeder holes must be preserved.

It is an object of the present invention to provide an improved tape splicer for tapes that employ a series of regularly spaced feeder holes for advancing the tape.

Another object is to provide a tape splicer for splicing a data tape at the end of a message while preserving the regularity of the tape feeder holes.

Still another object is to provide a tape splicer for data tapes, the splicer being useful either for splicing a tape within a message or for splicing a tape at the end of a message.

A further object is to provide a data tape splicer that is simple and is easy to use for permanently splicing tape in a matter of seconds.

In accordance with a preferred embodiment of the invention, the aforegoing objects are achieved by a data tape splicer that comprises: a base plate that has a track; a pair of work blocks supported upon the base plate for relative movement along the track, each work block having aligning pins that are adapted to mate with the feeder holes in a section of a data tape to be spliced; a pair of parallel cutter blades that are pivotable about an axle of a support for shearing and squaring the ends of two tape sections mounted upon the work blocks, respectively; and a drop cover and drop cover locking means for each work block. Two tape sections to be spliced at the end of a message are mounted on the work blocks; are sheared square at their ends by the cutter blades; the squared ends of the tapes are abutted by adjusting the relative position between the work blocks; a splicing tape is applied to the abutted tape ends; and the drop cover plates are closed and locked for creating a firm bond between the coded and splicing tapes and to insure minimum thickness build-up. A torn tape to be spliced within a message is spliced in the same way, except that the cutting step is omitted.

Figures 4, 5, 6, 7:
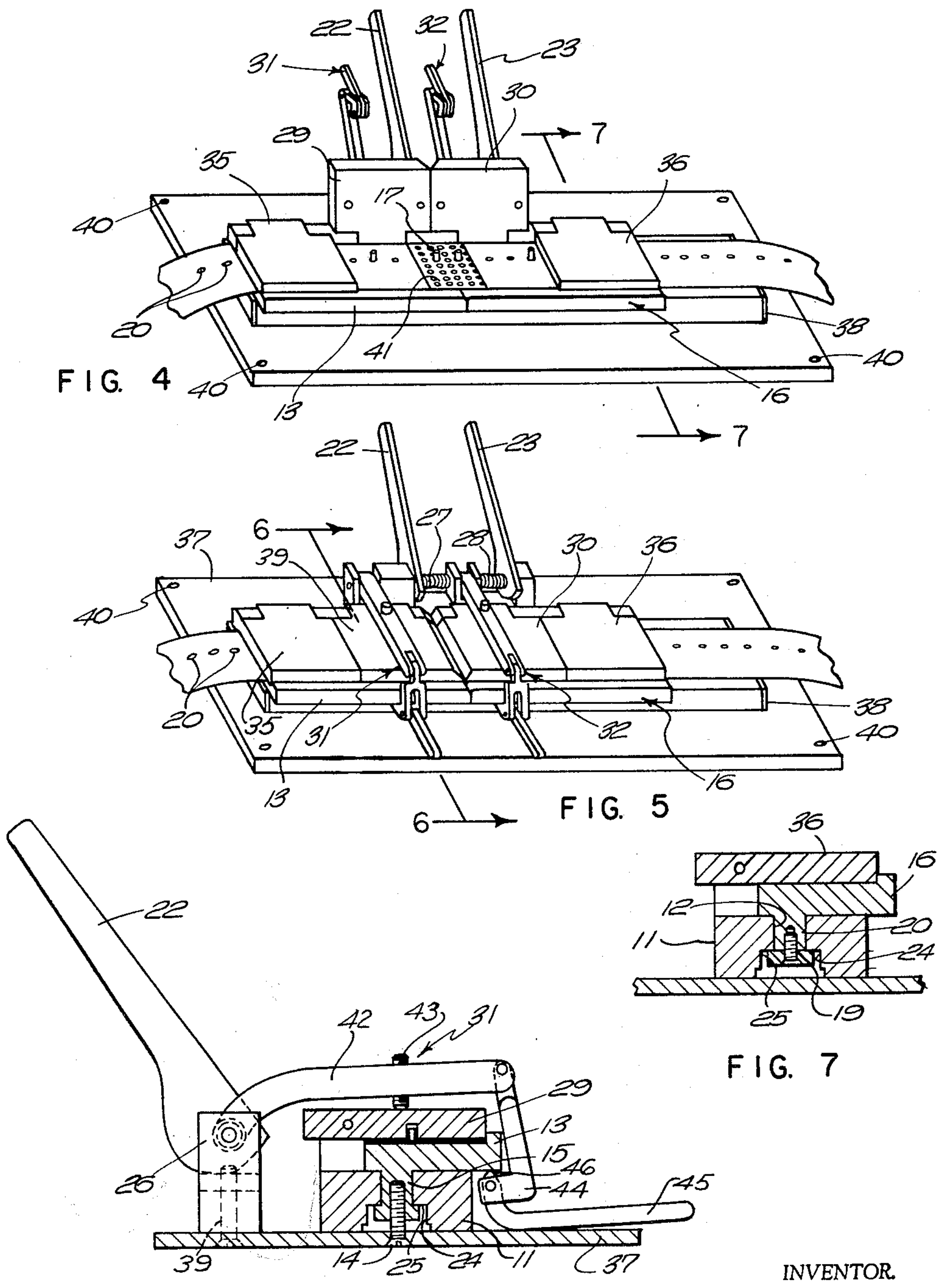
FIG. 4 is a perspective view which shows the two work blocks in abutment and further shows a splicing tape in place over the squared, abutting ends of the two tapes.
FIG. 5 is a perspective view that shows the two work blocks in abutment and the drop covers closed and locked upon the work blocks.
FIG. 6 is a cross sectional view of the tape splicer taken along the line 6—6 in FIG. 4, and shows one of the cover plates as it is being locked to its work block.
FIG. 7 is a cross sectional view of the tape splicer taken along line 7—7 of FIG. 4.

Referring to the various figures of the drawings, where like reference numerals indicate similar parts, 11 is a base plate upon which a pair of work blocks 13 and 16 are supported for relative movement along a longitudinally extending track 12. Four aligning pins 17 project upwardly from block 13 and four aligning pins 18 project upwardly from block 16. The aligning pins 17 and 18 are positioned to mate with a series of regularly spaced feeder holes 20 in two sections of tape that are to be spliced. With the blocks 13 and 16 in abutment, as is illustrated in FIGS. 4 and 5, the aligning pins 17 are spaced from the aligning pins 18 so that the feeder holes of an unbroken tape would mate with the aligning pins on both of the work blocks, if the unbroken tape is laid flat across the faces of both work blocks.

A pair of cutter blades 22 and 23 are pivotable about an axle of a support 26. The blades 22 and 23 are pivotable in parallel planes which are transverse the track 12 for shearing and squaring the ends of two sections of tape that are to be spliced at the end of a message. Two springs 27 and 28 normally bias the cutter blades 22 and 23, respectively, in upwardly extending positions.

A drop cover 29 is pivotably mounted upon the work block 13 and a drop cover 30 is pivotably mounted upon the work block 16 as illustrated. Drop cover locking means 31 and 32 are mounted upon the support 26 for locking the drop covers 29 and 30, respectively, as shown in FIG. 5. Additional drop covers 35 and 36 are pivotably mounted upon the work blocks 13 and 16, respectively, for reasons which will become more clear further along. Holes 33 are provided in covers 35 and 29 for mating with the aligning pins 17. Similarly, holes 34 are provided in covers 30 and 36 for mating with the aligning pins 18.

The base plate 11 is attached to a bed plate 37. The bed plate has four holes 40 for receiving screws or bolts for securing the bed plate to a work table, not shown. The support 26 for the cutter blades 22 and 23 and for the drop cover locking means 31 and 32 is secured to the bed plate 37 by screws 39 as is illustrated in FIG. 6, for example. The cover locking means 31, 32 are basically composed of a pressure bar 42 having an adjusting screw 43 therethrough that engages the cover. Locking is secured by a pivoted locking lever 44 and pivoted handle 45 as best illustrated in FIG. 6. It will be noted that point contact is had between the end 46 of handle 45, the end 46 acting as a cam to pull the assembly into tight engagement with the cover 29 as handle 45 is rotated toward bed plate 37.

The work block 13 is attached to the base plate 11 in a fixed position along the track 12 by screws 14 engaging the T-shaped projection 15 from bed plate 37. The right-hand edges of the work block 13 and the drop cover 29 substantially lie in the plane of the cutter blade 22. Thus, if blade 22 is rotated about its pivot toward the base plate 11, the blade 22 just clears the right-hand edges of parts 29 and 13 and comes down to meet the face of base plate 11 squarely.

The track 12 is a longitudinally extending slot or keyway through the top of the plate 11 having undercut portions 24 providing surfaces 25. The track or slot 12 in the base plate 11 cooperates with a downwardly extending projection 20 from the work block 16 for guiding the work block. The work block 16 thus is slidably secured to the base plate 11 and held in position by a plate 19 fastened to the underside of the work block 16, which plate slidably engages the surface 25, but is adapted to be movable along the track 12. The projection 20 abuts an end plate 38 secured to the base plate 11 and in this one position of block 16 (see FIG. 3), the left-hand edges of the work block 16 and the drop cover 30 substantially lie in the plane of the cutter blade 23. Thus, if the blade 23 is rotated about its pivot toward the base plate 11, the blade 23 just clears the left-hand edges of parts 30 and 16 and comes down to meet the face of base plate 11 sequarely.

In another position for the movable work block 16, the left-hand edge of block 16 abuts the right-hand edge of the work block 13. This other position is shown in FIGS. 4 and 5.

The data tape splicer is used in the following manner: First, the drop covers 35, 29, 30 and 36 are opened by applying a slight pressure to the back edge of each cover. The back edges of the covers overhang the axes of the cover pivot supports.

Figures 1, 2, 3:
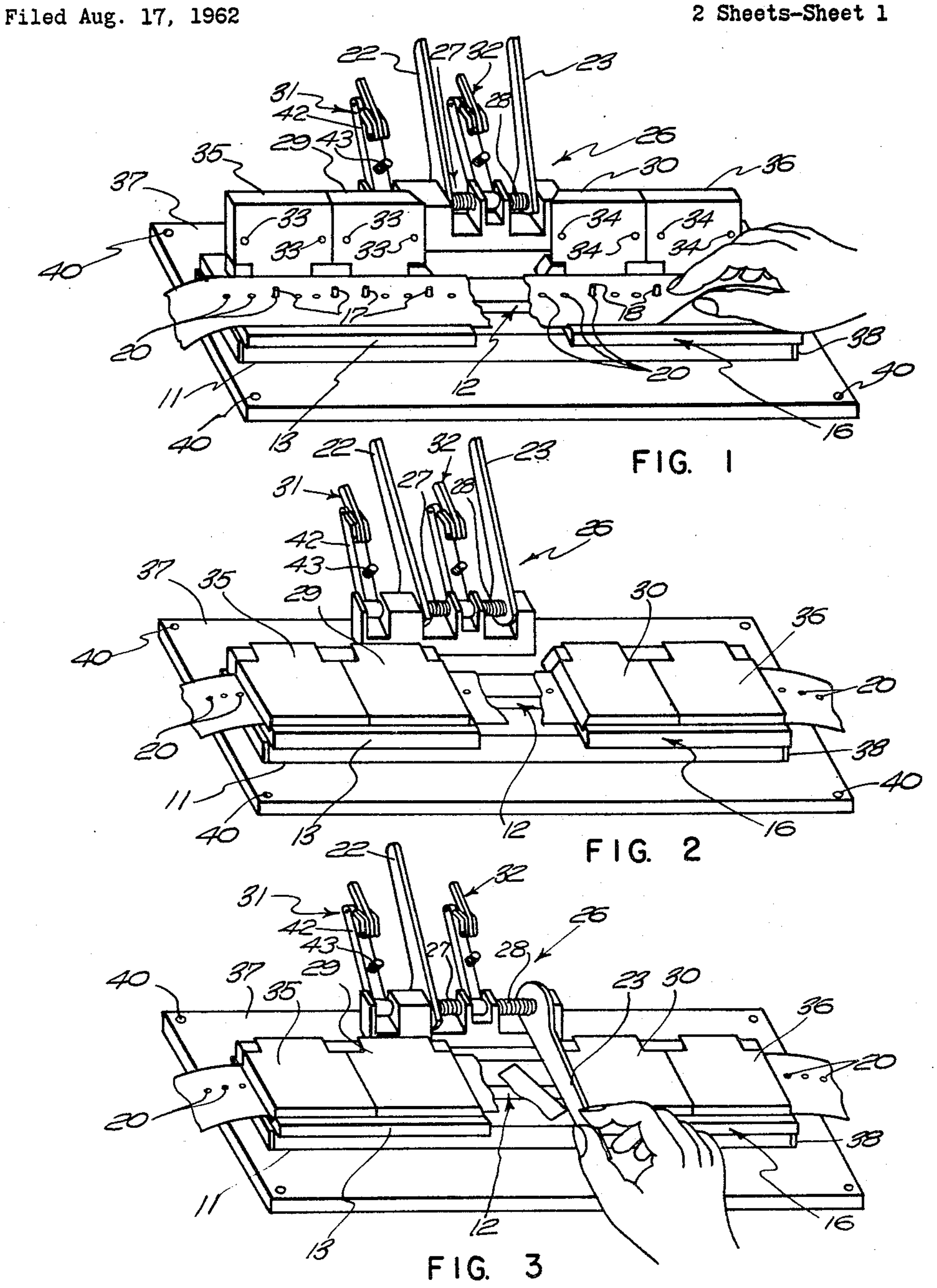
FIG. 1 is a perspective view of the tape splicer and shows the work blocks separated, the drop covers in open positions, and two tape sections pinned to the work blocks, respectively.
FIG. 2 is a perspective view of the tape splicer with the work blocks in the same positions shown in FIG. 1 but with the drop covers closed.
FIG. 3 is a perspective view that is similar to the view of FIG. 2 but shows one of the cutter blades being used for shearing an end of one of the tape sections.

If the tape to be spliced is at the end of a message code, two tape sections are inserted upon the aligning pins 17 and 18 on the work blocks 13 and 16, respectively, with the ends of the tape sections extending past the edges of the blocks as is illustrated in FIG. 1. After the tape sections have been inserted, the drop covers 35, 29, 30 and 36 are closed as is illustrated in FIG. 2.

In FIG. 2, the work block 16 is shown in its extreme right-hand position in spaced relationship relative to the work block 13. Two parallel edges of the work blocks 13 and 16 substantially lie in the planes of the cutter blades 22 and 23, respectively. The cutter blades then are used to shear the tape sections for squaring the tape ends. FIG. 3 illustrates the shearing step, using the right-hand cutter blade 23.

After the tape sections have been sheared to square the tape ends, the right-hand block 16 is moved to the left along the track 12. The work blocks 13 and 16 abut, and the squared ends of the tape sections also abut. The drop covers 29 and 30 are raised, as is illustrated in FIG. 4.

One inch or less of a slightly moistened, pre-gummed, fully-punched splicing tape 41 is positioned on the alignment pins 17 and 18 as is illustrated in FIG. 4, and the drop covers 29 and 30 are closed. The covers 29 and 30 are locked by the drop cover locking means 31 and 32.

Locking the covers 29 and 30 compresses the splice to insure good adhesion and a minimum thickness build-up. The thickness of the splicing tape 41 insures adequate pressure for making a good splice. After the covers have remained locked for about thirty seconds, they are unlocked and the spliced tape removed from the tape splicer.

If the tape to be spliced is within a message code, the shearing steps are omitted. Moreover, before pinning the tape to the work blocks 13 and 20, the right-hand work block 16 is moved to the left in abutment with the work block 13. Once the tape to be spliced within a message has been positioned for perfect fit on the alignment pins of the abutting work blocks 13 and 16, the splicing is accomplished in the way that has been described about with reference to FIGS. 4 and 5.

Since changes can be made in the device as specifically disclosed and different words of description might have been used without departing from the spirit of the present invention, it is understood that the invention is limited solely by the scope of the accompanying claims.

I claim:

1. A punched data tape splicer comprising a base plate, a work block fixed on said plate, said base plate having a track extending longitudinally from said block, a second work block movably mounted on said base plate and guided by said track for movement into abutting relation with the fixed work block, said work blocks having tape supporting surfaces in a single plane and a plurality of pins on each block projecting from said work supporting surfaces with the pins of the two blocks uniformly spaced equivalent to the openings in the tape to be received when the blocks are in abutting relation, each of said blocks having two covers, the adjacent covers of the two blocks when abutting exposing the tape splicing area when lifted and the other two remote covers serving to hold the tape in position while the adjacent covers are lifted for splicing the tape.

2. A punched data tape splicer as in claim 1 wherein there are a pair of cutters swingable in parallel paths across the path of movement of the movable block to sever the tape ends to be spliced and provide abutting ends for engagement when the blocks are moved into abutting relation for the application of a patch thereto to provide a splice.

3. A punched data tape splicer as in claim 1 wherein the adjacent covers are hinged to their respective blocks to swing into engagement with the tape and means to clamp the adjacent covers in position and urging them toward said tape.

References Cited by the Examiner

UNITED STATES PATENTS

| | | | |
|---|---|---|---|
| 962,381 | 6/10 | Nickerson et al. | 156—507 |
| 1,173,142 | 2/16 | Bernard | 156—505 |
| 1,459,822 | 6/23 | Carleton | 156—507 |

EARL M. BERGERT, *Primary Examiner.*